May 12, 1959  H. W. CLARKE  2,886,225
DISH AND TRAY COMBINATION
Filed June 24, 1955
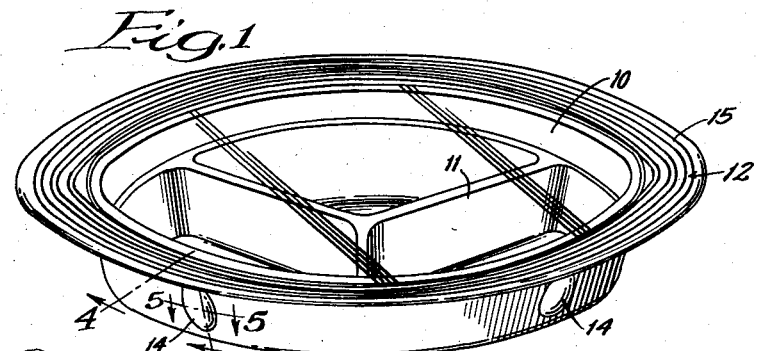
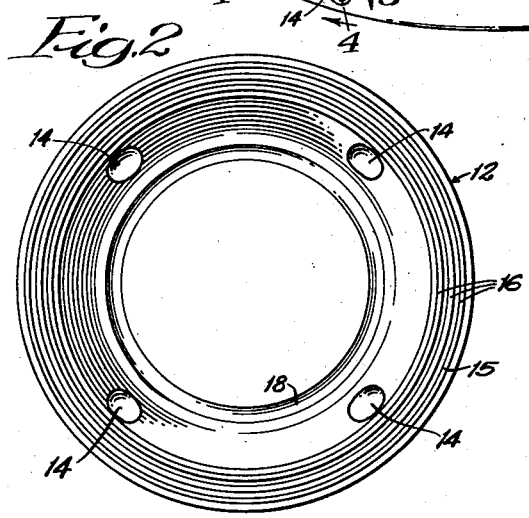
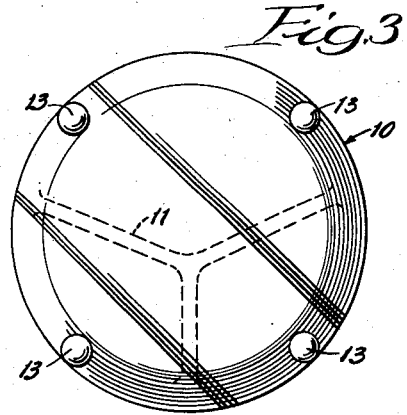
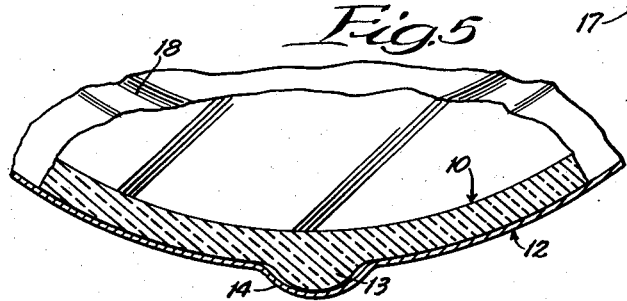
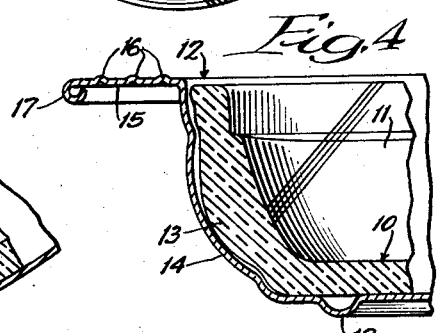
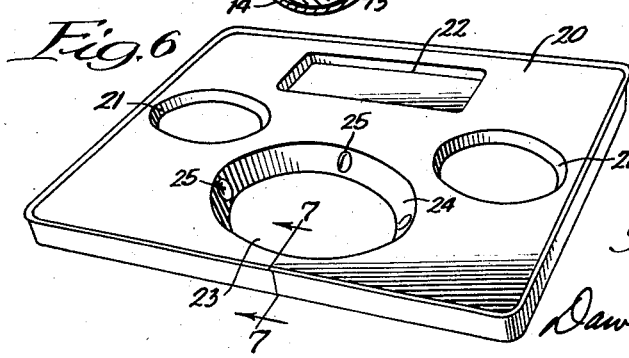
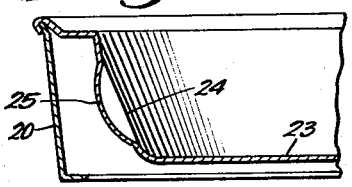
INVENTOR:
Houghton W. Clarke,
BY
Dawson, Tilton & Graham,
ATTORNEYS.

United States Patent Office 2,886,225
Patented May 12, 1959

2,886,225

DISH AND TRAY COMBINATION

Houghton W. Clarke, Evanston, Ill., assignor of ninety-nine percent to Mealpack Corporation, Evanston, Ill., a corporation of Illinois Application June 24, 1955, Serial No. 517,743

4 Claims. (Cl. 224—48)

This invention relates to a dish and tray combination and the invention is particularly useful in connection with protecting and maintaining the savory condition and temperatures of prepared hot or cold foods after serving; to expedite assembly and serving of complete meal trays, etc.

An object of the present invention is to provide a heavy dish formed of heat absorbable material which will release heat slowly, while at the same time providing a flanged receptacle or tray for supporting the dish while it contains the prepared food. Another object is to provide in such a structure a flanged support such as a tray equipped with means whereby the heavy dish charged with heat or cold is releasably interlocked with the tray while at the same time permitting selective rotation of the dish with respect to the tray, when this is desired. A still further object is to provide a tray and dish combination whereby the dish is supported at selected spaced points where the dish is thickest, whereby heat or cold is drained from the dish as slowly as possible and the dish is maintained in a condition for effectively releasing its heat or cold to the food thereon. Other specific objects and advantages will appear as the specification proceeds.

The invention is shown, in an illustrative embodiment, by the accompanying drawing, in which—

Figure 1 is a perspective view of a dish and dish holder combination embodying my invention; Fig. 2, a top plan view of the dish holder illustrated in Fig. 1; Fig. 3, a bottom plan view of the dish shown in Fig. 1; Fig. 4, a detail sectional view, the section being taken as indicated at line 4—4 of Fig. 1; Fig. 5, a detail sectional view, the section being taken as indicated at line 5—5 of Fig. 1; Fig. 6, a perspective view of a modified form of tray which may be employed; and Fig. 7, a broken detail sectional view, the section being taken as indicated at line 7—7 of Fig. 6.

In the illustration given in Figs. 1 to 5 inclusive, 10 designates a dish, which may, if desired, be provided with central partition walls 11, and 12 designates a tray adapted to receive the dish 10.

The dish 10 is preferably formed of a thick material which absorbs heat to a deep extent and which gives up the deep heat slowly when in contact with hot prepared foods. Ovenware glass or crockery, etc. may be employed. Excellent results have been obtained with the heat-resistant glass known as Pyrex. Various resins also may be utilized for this purpose. The dish 10 is provided at the four spaced points indicated best in Fig. 3 with outwardly and downwardly-protruding knobs 13, which are preferably rounded so as to present outwardly a generally semi-spherical, semi-globular, or teardrop shape. The knobs are received within rounded recesses 14 formed in the tray 12, as shown best in Figs. 2, 4 and 5.

The tray 12 is preferably provided at its top with an outwardly-extending wide flange 15, and the flange if desired, may be provided with reinforcing annular ribs 16 and an end rim 17. I prefer also to provide the tray with a bottom annular ring or rib 18, as shown best in Fig. 4. The tray 12 may be formed of plastic, metal, or any suitable material. I prefer to so arrange the parts that the main support for the inner thick dish 10 is carried by the knobs 13 within the recesses 14 so that the heat leaving the dish must bleed outwardly through the knobs which represent the thickest portions of the dish.

By utilizing the generally semi-globular shaped knobs 13 cooperating with the rounded recesses 14 which snugly receive the knobs 13, I find that when the dish 10 is loaded with food, the knobs effectively lock the dish within the tray against relative movement. However, if it should be desired to rotate the dish with respect to the tray, this may be accomplished by a very slight raising of the dish so that the dish will move out of the recess and the dish can then be rotated to bring the knobs into the next recesses. In this operation, the inclined side wall of the tray 12 cooperates in the releasing of the knobs from the tray recesses 14.

In the operation of the device, the dish 10 is normally heated within a heat-charging device until the same contains a high degree of heat. The dish is then mechanically moved onto a traveling belt or other device, where it is filled with hot foods. The dish containing the foods may then be introduced into the tray 12 and rotated slightly to bring the knobs 13 thereof into an interlocking engagement with the recesses 14 of the tray 12. The tray 12 may then be introduced into a heated chamber or other storing cabinet, the flange 15 being effective in supporting the tray upon fins or supports carried within the cabinet (not shown). If desired, the tray 12 with the dish containing the hot foods may be carried directly to the person to whom the food is to be served.

Should cold foods be served, the dish 10 is first subjected to cold in a compartment for the storing of cold therein, and then, after receiving the cold food, is placed within a chilled compartment or else served directly to an individual.

By suspending the heated dish for the most part through the knobs 13 engaging the recessed portions 14 of the tray, it is found that a minimum of heat or cold bleeds from the deeply-charged dish 10 and the prepared foods remain hot or cold, as the case may be, for substantial periods of time.

In the structure shown in Figs. 6 and 7, the tray 20 is provided with a plurality of apertures for receiving various types of dishes. It may be formed of plastic, metal or other suitable material. Small circular apertures 21 are provided, and an elongated aperture 22 is shown. These are effective for receiving vessels of different sizes and shapes. Optionally, within the tray may also be formed a circular opening 23 as shown, and bounding the opening is a downwardly and inwardly-inclined side wall 24 having recesses 25 therein adapted to receive the knobs 13 of the dish 10. In this structure, the receptacle for the dish 10 is open-bottomed, and the dish is suspended again largely through the knobs 13 which engage the recesses 25, whereby the thickest portion of the dish is employed in the support of the dish so as to reduce the bleeding away of heat or cold from the dish.

While, in the foregoing specification, I have set forth specific structures in considerable detail for the purpose of illustrating embodiments of my invention, it will be understood that such details of structure may be varied widely by those skilled in the art without departing from the spirit of my invention.

I claim:

1. A dish and dish holder combination, comprising a tray having a bottom wall and an annular and upwardly and outwardly inclined side wall defining an upwardly-opening chamber, and a thick dish resistant to heat transfer nested within the chamber of said tray, said dish having an annular and upwardly and outwardly inclined side wall and having a plurality of circumferentially spaced knobs projecting laterally from the outer surface of said wall intermediate the upper and lower limits thereof, said tray having a plurality of recesses along the inner surface of the inclined side wall thereof for receiving said knobs and for releasably locking said dish and tray against relative rotation, said knobs having the outermost portions thereof bearing outwardly against said tray within the central portions of the recesses thereof for suspending said dish within said chamber, said tray also having a lateral flange extending outwardly from the upper edge thereof.

2. The structure of claim 1 in which each of said knobs and each of said recesses is semi-globular in shape.

3. A dish and dish holder combination, comprising a tray having a bottom wall and an annular and upwardly and outwardly inclined side wall defining an upwardly-opening chamber, and a thick ovenware dish resistant to heat transfer nested within the chamber of said tray, said dish having an annular and upwardly and outwardly inclined side wall and having a semi-globular knob projecting laterally from the outer surface of said wall intermediate the upper and lower limits thereof, said tray having a semi-globular recess along the inner surface of the inclined side wall thereof for receiving said knob and for releasably locking said dish and tray against relative rotation.

4. The structure of claim 3 in which said tray also has a lateral flange projecting outwardly from the upper edge thereof.

References Cited in the file of this patent

UNITED STATES PATENTS

| | | |
|---|---|---|
| 126,374 | Bonington | May 7, 1872 |
| 190,352 | Milligan | May 1, 1877 |
| 234,739 | Beattie | Nov. 23, 1880 |
| 246,946 | Flagg | Sept. 13, 1881 |
| 260,470 | Fisher | July 4, 1882 |
| 284,531 | Berry | Sept. 4, 1883 |
| 403,279 | Manning | May 14, 1889 |
| 481,982 | Taylor | Sept. 6, 1892 |
| 482,603 | Weigel | Sept. 13, 1892 |
| 549,278 | Ryan | Nov. 5, 1895 |
| 594,764 | Smith et al. | Nov. 30, 1897 |
| 949,025 | Matthews | Feb. 15, 1910 |
| 1,687,846 | Nelson | Oct. 16, 1928 |
| 1,876,264 | Tucker | Sept. 6, 1932 |
| 1,881,873 | Newcomb | Oct. 11, 1932 |
| 1,924,011 | Willmott | Aug. 22, 1933 |
| 1,948,778 | Zoia | Feb. 27, 1934 |
| 2,034,868 | Henriksen | Mar. 24, 1936 |
| 2,119,342 | Morris | May 31, 1938 |
| 2,213,837 | Gill | Sept. 3, 1940 |
| 2,240,602 | Bartsch | May 6, 1941 |
| 2,517,018 | Nicholson | Aug. 1, 1950 |
| 2,545,528 | Murray | Mar. 20, 1951 |
| 2,614,399 | Roethel | Oct. 21, 1952 |

FOREIGN PATENTS

| | | |
|---|---|---|
| 3,248 | Great Britain | Feb. 13, 1896 |